(12) United States Patent
Balasubramanian et al.

(10) Patent No.: US 10,666,669 B2
(45) Date of Patent: *May 26, 2020

(54) SECURING SERVICES IN A NETWORKED COMPUTING ENVIRONMENT

(71) Applicant: INTERNATIONAL BUSINESS MACHINES CORPORATION, Armonk, NY (US)

(72) Inventors: Swaminathan Balasubramanian, Troy, MI (US); Radha M. De, Howrah (IN); Ashley D. Delport, Ridgefield, CT (US); Indrajit Poddar, Sewickley, PA (US); Cheranellore Vasudevan, Bastrop, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,962

(22) Filed: Apr. 17, 2019

(65) Prior Publication Data
US 2019/0245874 A1 Aug. 8, 2019

Related U.S. Application Data

(63) Continuation of application No. 15/846,572, filed on Dec. 19, 2017, now Pat. No. 10,305,920, which is a
(Continued)

(51) Int. Cl.
*H04L 29/06* (2006.01)
*G06F 21/10* (2013.01)
(Continued)

(52) U.S. Cl.
CPC ......... *H04L 63/1416* (2013.01); *H04L 63/08* (2013.01); *H04L 63/102* (2013.01);
(Continued)

(58) Field of Classification Search
CPC ....... H04L 29/06; H04L 9/32; H04L 63/1416; H04L 63/08; H04L 63/102; G06F 21/55;
(Continued)

(56) References Cited

U.S. PATENT DOCUMENTS 6,978,381 B1 * 12/2005 Te .......................... G06F 21/604
705/54
7,475,252 B2 1/2009 Jeffries et al.
(Continued)

FOREIGN PATENT DOCUMENTS

CN 102722663 10/2012

OTHER PUBLICATIONS

Android Developers, "Account Manager", https://developer.android.com/reference/android/accounts/AccountManager.html, Accessed May 5, 2016, 11 pages.
(Continued)

*Primary Examiner* — Jayesh M Jhaveri
(74) *Attorney, Agent, or Firm* — Michael O'Keefe; Andrew D. Wright; Roberts Calderon Safran & Cole P.C.

(57) ABSTRACT

A computer-implemented method includes: detecting, by a user device, an event that indicates a potential security compromise of the user device; determining, by the user device, a service accessible on the user device; sending, by the user device, a breach notification to a service provider corresponding to the service accessible on the user device; receiving, by the user device, a security profile from the service provider; and restricting, by the user device, access to the service provider by a client of the service provider on the user device until the security profile is satisfied by a user completing a security challenge defined in the security profile.

20 Claims, 7 Drawing Sheets

Related U.S. Application Data continuation of application No. 15/251,203, filed on Aug. 30, 2016, now Pat. No. 10,171,484.

(51) Int. Cl.
  *G06F 21/57* (2013.01)
  *G06F 21/55* (2013.01)
  *G06F 21/62* (2013.01)
  *H04L 9/32* (2006.01)

(52) U.S. Cl.
  CPC ...... *H04L 63/1433* (2013.01); *H04L 63/1441* (2013.01); *G06F 21/10* (2013.01); *G06F 21/554* (2013.01); *G06F 21/577* (2013.01); *G06F 21/6218* (2013.01); *G06F 2221/2113* (2013.01); *H04L 9/32* (2013.01); *H04L 9/3271* (2013.01)

(58) Field of Classification Search
  CPC .......... G06F 21/10; G06F 21/62; G06F 21/57; G06F 21/6218; G06F 2221/2113
  See application file for complete search history.

(56) References Cited

U.S. PATENT DOCUMENTS

| | | | |
|---|---|---|---|
| 7,788,700 B1* | 8/2010 | Feezel | G06F 21/31 713/163 |
| 8,347,374 B2 | 1/2013 | Schneider | |
| 9,178,872 B2* | 11/2015 | Spalka | G06F 21/40 |
| 9,602,279 B1 | 3/2017 | Tran et al. | |
| 9,639,711 B2* | 5/2017 | Sturonas | H04L 63/1466 |
| 9,832,184 B2 | 11/2017 | Purushothaman et al. | |
| 10,171,484 B2 | 1/2019 | Balasubramanian et al. | |
| 2005/0114604 A1 | 5/2005 | Artobello et al. | |
| 2008/0066190 A1* | 3/2008 | Shu | G06F 21/31 726/28 |
| 2013/0013921 A1 | 1/2013 | Bhathena et al. | |
| 2013/0247136 A1 | 9/2013 | Chieu et al. | |
| 2014/0033299 A1 | 1/2014 | McGloin et al. | |
| 2014/0196129 A1 | 7/2014 | Amin | |
| 2015/0033031 A1 | 1/2015 | Swaminathan et al. | |
| 2015/0033305 A1* | 1/2015 | Shear | G06F 21/45 726/11 |
| 2015/0249644 A1 | 9/2015 | Xu | |
| 2015/0271172 A1 | 9/2015 | Hamlin | |
| 2015/0347782 A1* | 12/2015 | Sturonas | H04L 63/1466 713/165 |
| 2018/0109549 A1 | 4/2018 | Balasubramanian et al. | |
| 2019/0253431 A1* | 8/2019 | Atanda | G06F 21/62 |

OTHER PUBLICATIONS

Mell et al., "The NIST Definition of Cloud Computing", NIST, Special Publication 800-145, Sep. 2011, 7 pages.

List of IBM Patents or Patent Applications Treated as Related, dated Apr. 17, 2019, 1 page.

"List of IBM Patents or Patent Applications Treated as Related", dated Nov. 27, 2019, 1 page.

Specification "Securing Services in a Networked Computing Environment" and drawings in related U.S. Appl. No. 16/692,478, filed Nov. 22, 2019, 46 pages.

Notice of Allowance dated Aug. 29, 2019 in related U.S. Appl. No. 16/206,054, 10 pages.

\* cited by examiner

SECURING SERVICES IN A NETWORKED COMPUTING ENVIRONMENT

BACKGROUND

The present invention generally relates to security in computing systems and, more particularly, to securing services in a cloud computing environment.

End users are able to access services on the cloud from multiple devices. This capability leads to usage scenarios such as: a user starts working on a document from home on their laptop; the same user continues editing the document using their tablet while commuting; and the same user completes the document using their work computer. An extension of this scenario exists in which multiple distinct users with one or more distinct devices may access a same document (e.g., a shared document) through the same or several different cloud services. Such scenarios are enabled by a defining characteristic of the cloud computing model, i.e., always connected interaction and immediate synchronization of data among devices. This is in contrast to the thin client computing model in which all data is always maintained centrally and each device is a thin client that reads/writes data immediately (e.g., within a session).

It is common for a user to have multiple different cloud client applications on a single computer device, cloud client applications being applications that follow the cloud computing model with each application typically connected to a respective cloud service provider. For example, a user's smartphone may include different cloud client applications such as: a file storage and synchronization application with a first cloud service provider; a business social network application with a second cloud service provider; and a note taking, organizing, and archiving app with a third cloud service provider. Unlike apps that use the thin client model, cloud client applications do not require the user to respond to repeated authentication challenges for each session. Instead they rely on stored security profiles including authentication tokens in the device which are created after the first authentication challenge. However, since these cloud client applications do not require a user to authenticate for each session, all of the cloud client applications on a single user device may be subject to a security breach if the user device itself is compromised.

SUMMARY

In an aspect of the invention, a computer-implemented method includes: detecting, by a user device, an event that indicates a potential security compromise of the user device; determining, by the user device, a service accessible on the user device; sending, by the user device, a breach notification to a service provider corresponding to the service accessible on the user device; receiving, by the user device, a security profile from the service provider; and restricting, by the user device, access to the service provider by a client of the service provider on the user device until the security profile is satisfied by a user completing a security challenge defined in the security profile.

In an aspect of the invention, there is a computer program product for securing services in a networked computing environment. The computer program product includes a computer readable storage medium having program instructions embodied therewith, the program instructions being executable by a computer device to cause the computer device to: receive, at the computer device, a breach notification from a user device, wherein the user device includes a client that corresponds to a service provided by the computer device, and the breach notification indicates a potential security compromise of the user device; and transmit, by the computer device, a security profile to the user device, wherein the security profile restricts access by the client to the service provided by the computer device until after a user satisfies the security profile.

In an aspect of the invention, a system includes: a CPU, a computer readable memory and a computer readable storage medium associated with a computer device of a service provider; program instructions to receive, by the computer device, a breach notification from a user device, wherein the user device includes a client that corresponds to the service provider, and the breach notification indicates a potential security compromise of the user device; program instructions to identify, by the computer device, a plurality of user devices that have the client; and program instructions to transmit, by the computer device, a respective security profile to each of the identified plurality of user devices. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
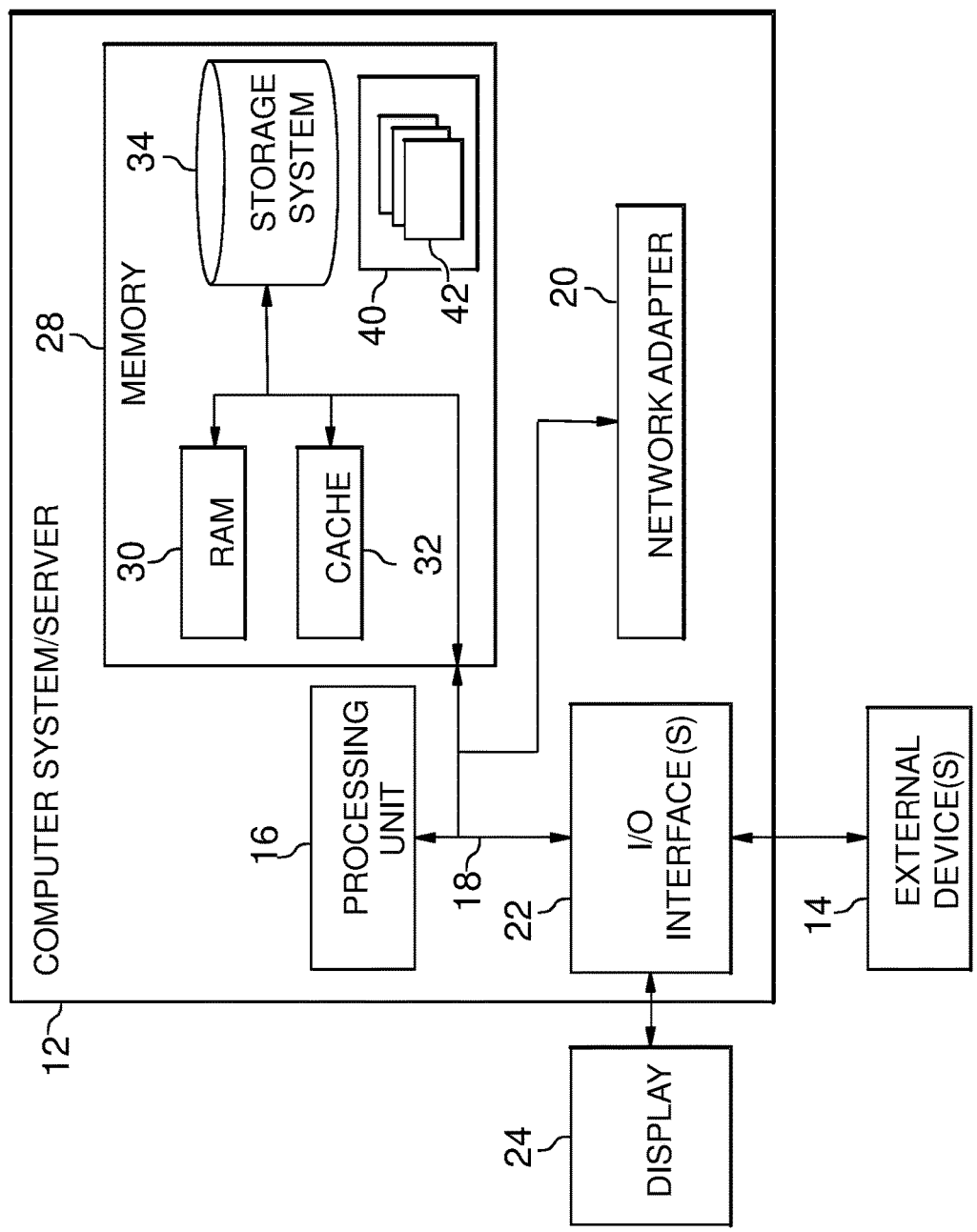
FIG. 1 depicts a cloud computing node according to an embodiment of the present invention.

The present invention generally relates to security in computing systems and, more particularly, to securing services in a cloud computing environment. According to aspects of the invention, a device having plural different cloud client applications is configured to: detect an event that indicates a potential security breach of the device, and increase the security profile level of at least one of the plural different cloud client applications on the device based on the detected event. In embodiments, the security profile level of a cloud client application on another device of the same user is also increased. In further embodiments, the security profile of a cloud client application on a device of a second user that shares content with the first user is also increased. In this manner, implementations of the invention proactively apply security profiles to cloud services on the device at which the potential security breach is detected, automatically extend the security profile to devices and users that are related to affected device, and allow each cloud service to apply their security profiles differently.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
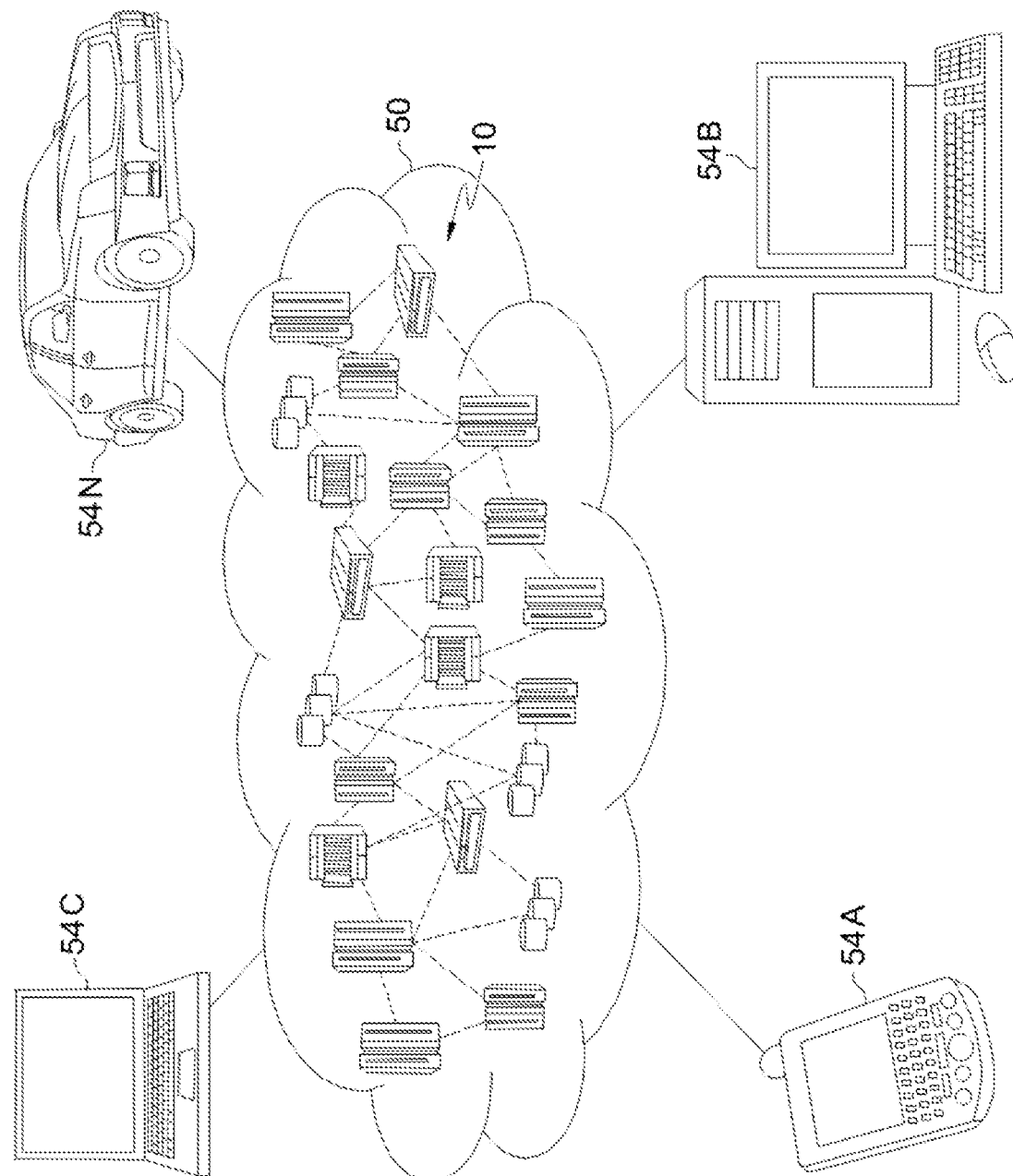
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
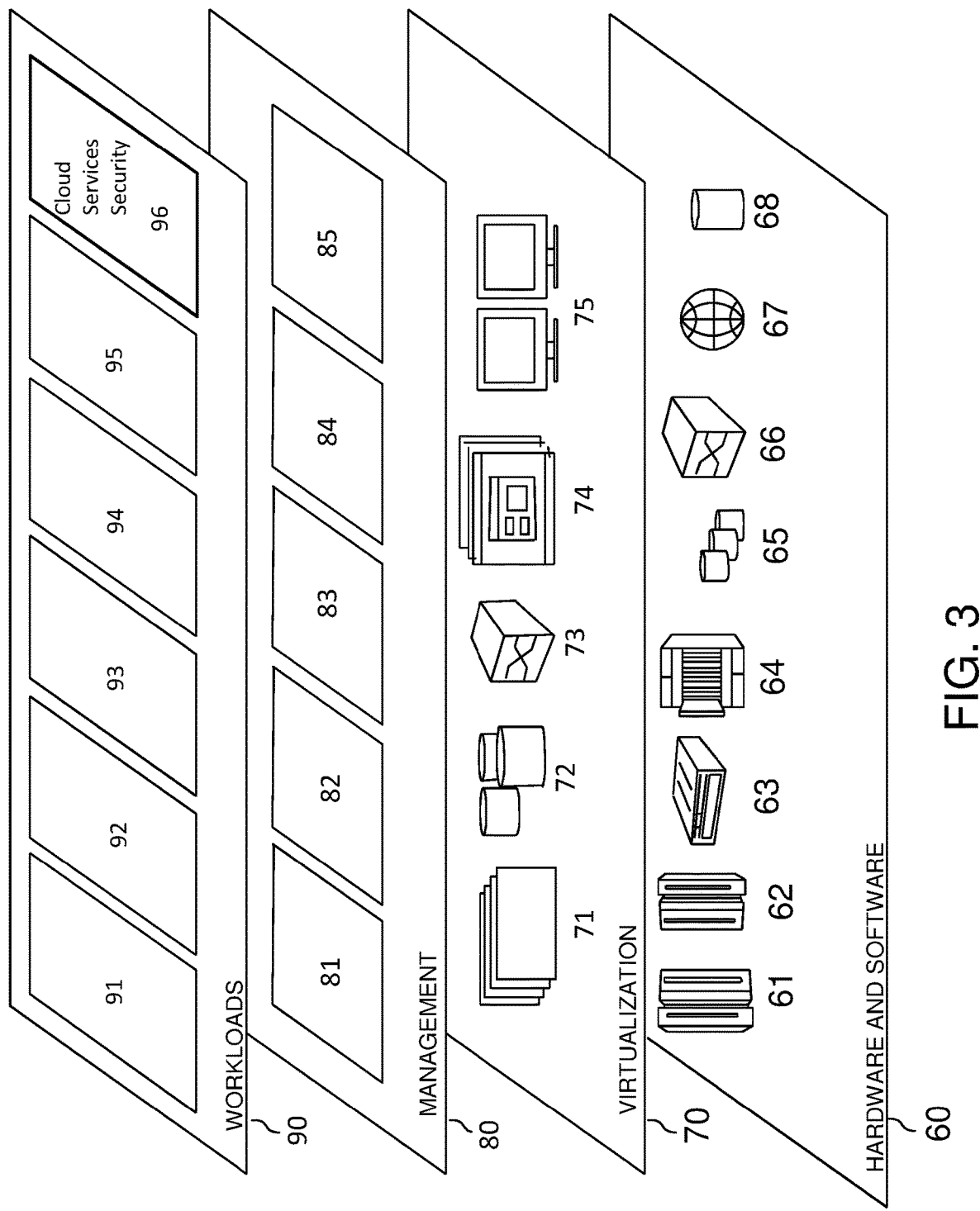
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cloud services security 96.

Referring back to FIG. 1, the program/utility 40 may include one or more program modules 42 that generally carry out the functions and/or methodologies of embodiments of the invention as described herein, such as the functionally of cloud services security 96 of FIG. 3. Specifically, the program modules 42 may receive user information, generate a service list based on the user information, and display user information and selected services for service provider personnel. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be implemented in the environment shown in FIG. 4.

Figure 4:
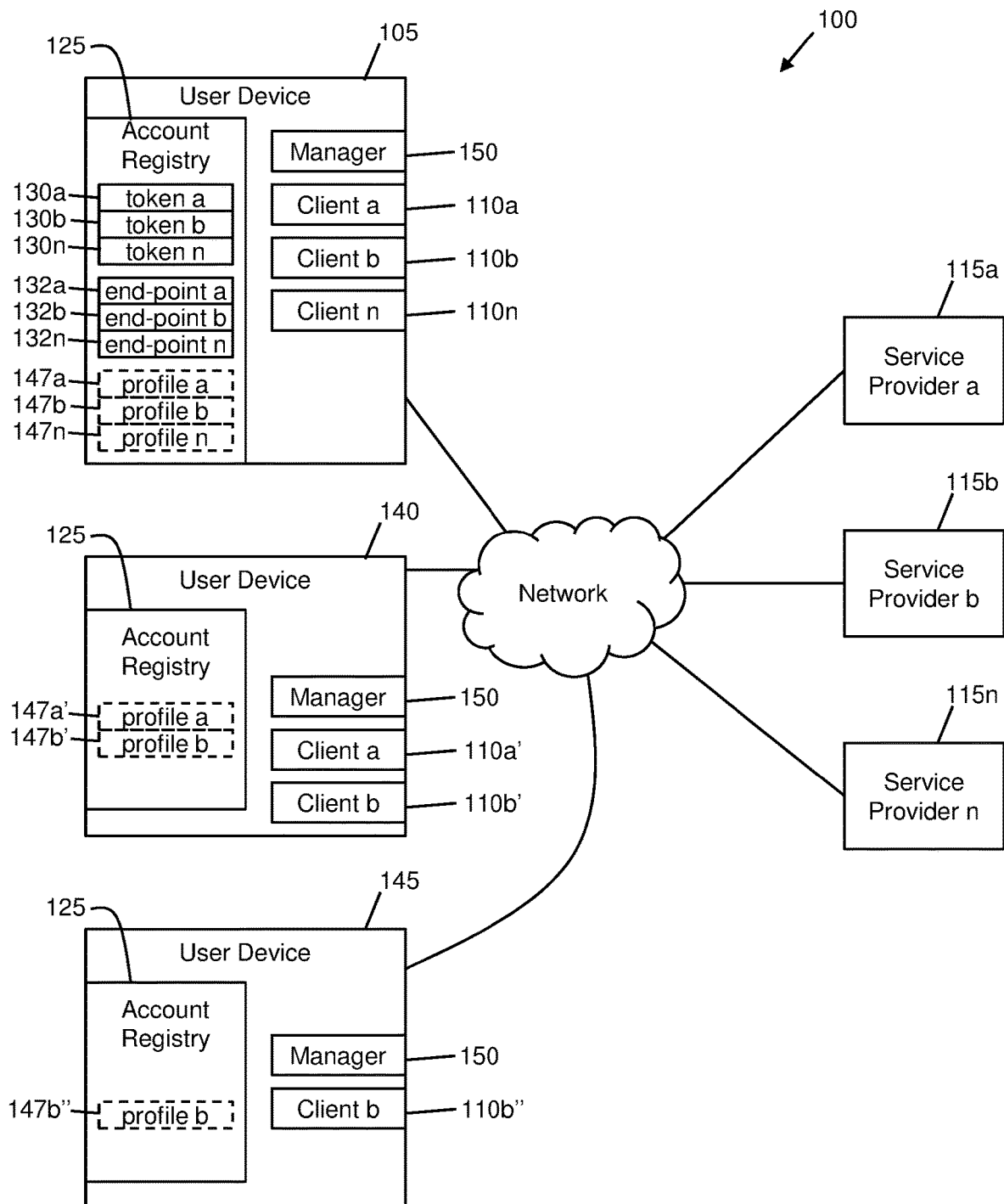
FIG. 4 shows an exemplary environment in accordance with aspects of the present invention.

FIG. 4 shows a networked computing environment 100 in accordance with aspects of the invention. The environment includes a user device 105, which may be any suitable user computing device such as a desktop computer, laptop computer, tablet computer, smartphone, smart watch, etc. The user device 105 may comprise one or more elements of the computer system 12 of FIG. 1 including, for example, a processor, memory, display, etc. In embodiments, a number of clients 110a, 110b, . . . , 110n are installed on the user device 105. The clients 110a-n may comprise cloud client applications (also called cloud service clients) and may be program modules 42 as described with respect to FIG. 1, for example. Each client 110a-n may correspond to a respective cloud service provider 115a, 115b, . . . , 115n. For example, client 110a is installed on the user device 105 as a client program of cloud service provider 115a, and provides services and/or functionality of the cloud service provider 115a at the user device 105. Similarly, client 110b corresponds to cloud service provider 115b, and client 110n corresponds to cloud service provider 115n. There may be any number "n" of clients and corresponding cloud service providers.

Each of the cloud service providers 115a-b may comprise a computing device such as a server, which may comprise one or more elements of the computer system 12 of FIG. 1. The user device 105 may communicate with each of the cloud service providers 115a-b via a network 120, which may be any suitable network such as a LAN, WAN, and the Internet. In embodiments, the network 120 is a cloud network and the user device 105 and each of the cloud service providers 115a-n are nodes in the cloud network, e.g., as shown in FIG. 2.

Still referring to FIG. 4, in embodiments the user device 105 includes an account registry 125 that stores pre-authentication tokens 130a, 130b, . . . , 130n associated with respective ones of the clients 110a-n. For example, token 130a is a data structure associated with client 110a and permits client 110a to access cloud service provider 115a without requiring the user to re-authenticate every time the client 110a is invoked. The token 130a may be provided to the user device 105 by the cloud service provider 115a during a previous login event and saved on the user device 105 for future access to the cloud service provider. For example, upon initiating the client 110a at an earlier time, the user may enter their authentication information (e.g., username, password, etc.) at the user device 105, and the user device 105 may transmit the authentication information to the cloud service provider 115a. Upon receiving the user authentication information, the cloud service provider 115a may create the token 130a (which may be a hash code, for example) and transmit the token 130a back to the user device 105 where the token 130a is stored in the account registry 125. In a subsequent invoking of the client 110a at this user device 105, the token 130a is used to authenticate the user, such that the user need not re-enter their authentication information during the subsequent invoking. The token 130a is specific to the user device 105 and the cloud service provider 115a, and the cloud service provider 115a may issue other tokens for other user devices of the same user. Tokens 130b-n may operate in a similar manner for clients 110b-n, respectively.

The account registry 125 may also store end-points 132a, 132b, . . . , 132n associated with respective ones of the clients 110a-n. In embodiments, each end-point 132a-n comprises a data structure that defines information on how to access one of the cloud service providers 115a-n via the network 120. For example, end-point 132a may define a URL, HTTP address, or socket connection for accessing cloud service provider 115a via the network 120, e.g., to establish communication between the user device 105 and the cloud service provider 115a when the client 110a is invoked. End-points 132b-n may operate in a similar manner for cloud service providers 115b-n, respectively.

With continued reference to FIG. 4, in accordance with aspects of the invention, the environment 100 also includes other user devices 140 and 145, each of which may be any suitable user computing device such as a desktop computer, laptop computer, tablet computer, smartphone, smart watch, etc. In an illustrative example, user devices 105 and 140 both belong to a same user (e.g., a first user) and user device 145 belongs to a different user (e.g., a second user). For example, user device 105 may be the first user's laptop computer, user device 140 may be the first user's desktop computer, and user device 145 may be the second user's laptop computer. Aspects of the invention are not limited to this exemplary arrangement of user devices, and other arrangements may be used.

As shown in FIG. 4, the user device 140 may include clients 110a' and 110b', which are the same as clients 110a and 110b respectively. In this manner, the first user may access the cloud service provider 115a via either one (or both) of the user devices 105 or 140. Similarly, the first user may access the cloud service provider 115b via either one (or both) of the user devices 105 or 140. In this example, user device 145 includes client 110b", meaning that the second user can access the cloud service provider 115b via the user device 145. Continuing this example, the first user and the second user may have shared content with the cloud service provider 115b. As but one possible example of shared content, the cloud service provider 115b may store a document that both the first user and the second user can view and edit via the clients 110b' and 110b", respectively.

Still referring to FIG. 4, the user device 105 includes a cloud security manager 150 in accordance with aspects of the invention. The manager 150 may be a program module (e.g., program module 42 of FIG. 1) on the user device 105 that is programmed to perform one or more of the functions described herein including but not limited to: detect an event that indicates a potential security compromise of the user device 105, identify all the cloud services available on the user device 105, and send a security breach notification to each individual cloud service provider 115a-n based on the detected event.

In accordance with aspects of the invention, the manager 150 is configured to detect an event that indicates a potential security compromise of the user device 105. In embodiments, the manager 150 communicates with the OS of the user device 105 to detect the event, which may include but is not limited to: exceeding a predetermined number of successive failed login attempts at the user device 105; a login attempt from a location that is inconstant with historic locations for the user device 105; port scanning of the user device 105. Aspects of the invention are not limited to these examples, and any desired event or combination of events may be defined as an event that indicates a potential security compromise of the user device 105. In implementations, failed login attempts at the user device 105 refers to login attempts of the user device 105 itself (e.g., entering a code or fingerprint to unlock the device 105) rather than login attempts at a particular one of the clients 110*a-n*.

According to aspects of the invention, upon detecting an event that indicates a potential security compromise of the user device 105, the manager 150 is configured to identify all the cloud services available on the user device 105 and send a security breach notification to each individual cloud service provider 115*a-n* based on the detected event. In embodiments, the manager 150 accesses the account registry 125 to determine which clients 110*a-n* are installed on the device. For each identified client 110*a-n*, the manager 150 may obtain (from the account registry 125) the respective end-point 132*a-n* of the cloud service provider 115*a-n* and send a breach notification to each individual cloud service provider 115*a-n* using the respective end-points 132*a-n*. A separate breach notification may be sent from the user device 105 to each individual cloud service provider 115*a-n* via the network 120, and may contain information including but not limited to: identifier of the user device 105 (e.g., a device ID); identifier of the user (e.g., user name); timestamp of the detected event (e.g., date and time); and type of the detected event (e.g., exceeding a predetermined number of successive failed login attempts).

Each cloud service provider 115*a-n*, upon receiving the breach notification from the user device 105, may take separate action to verify the security of the service. The actions may include, for example: applying security action at the user device 105; applying security action at another device associated with the same user (e.g., at user device 140); and applying security action at another device associated with a different user that shares content with the first user (e.g., at user device 145).

In embodiments, applying security action at the user device 105 includes a cloud service provider transmitting a security profile to the user device 105, wherein the security profile must be complied with (i.e., by the user completing a security challenge defined in the security profile) before the user is permitted to access the cloud service provider via the corresponding client. A security profile may define any desired security challenge, including but not limited to: re-authentication, answering a security question, completing a bio-metric challenge (e.g., retina scan, touch ID, etc.), and performing multi-factor authentication. For example, cloud service provider 115*a* may send a security profile 147*a* to the user device 105 that requires the user to re-authenticate, e.g., re-enter their user name and password in the client 110*a*. As another example, cloud service provider 115*b* may send a security profile 147*b* to the user device 105 that requires the user to authenticate from a second user device (e.g., authenticate using client 110*b*' at user device 140) within a certain time period, e.g., thirty minutes. In yet another example, cloud service provider 115*n* may send a security profile 147*n* to the user device 105 that requires the user to respond to a security question via the client 110*n* at the user device 105. Implementations of the invention are not limited to these examples, and any desired types of security challenges may be defined in a security profile.

Each of the security profiles 147*a-n* may comprise a data structure that is stored in the account registry 125 and may be different for each cloud service provider 115*a-n*. In embodiments, the security profile for a particular cloud service provider (e.g., cloud service provider 115*a*) is applied the first time the user invokes the corresponding client (e.g., client 110*a*) following the detecting the event that indicates the potential security compromise of the user device 105. In this manner, following the detected event, the user is prevented from accessing a particular cloud service provider until such time as the user satisfies the security profile that was issued by that cloud service provider. Upon satisfying the security profile, the user is granted normal access the particular cloud service provider (e.g., via the corresponding client). Normal access in this context refers to whatever access is afforded by a particular service provider when a user logs in via the corresponding client with no security restrictions.

In embodiments, applying a security action at another device associated with the same user includes a cloud service provider transmitting a security profile to the other device, wherein the security profile must be complied with before the user is permitted to access the cloud service provider from the other device. For example, upon receiving the breach notification from the user device 105, the cloud service provider 115*a* may determine that the same user has client 110*a*' installed on other user device 140, e.g., by accessing data that identifies devices for this user for this particular cloud service. The cloud service provider 115*a* may send a security profile 147*a*' to the other user device 140 that the user must comply with before the user is permitted to access the cloud service provider 115*a* via client 110*a*' on the other user device 140. The security profile 147*a*' sent to the other user device 140 may be the same as or different than the security profile sent to the user device 105. For example, the cloud service provider 115*a* may send a more rigorous security profile 147*a* (e.g., re-authenticate and answer a security question) to the user device 105 and a less rigorous security profile 147*a*' (e.g., re-authenticate only) to the other user device 140 since the detected event occurred at the user device 105.

In embodiments, applying a security action at a device associated with a second user that shares content with the first user includes a cloud service provider transmitting a security profile to the device of the second user, wherein the security profile must be complied with before the second user is permitted to access the cloud service provider from the other device. The security profile on the device of the second user may operate to restrict access to the cloud service by the second user until at least one of: a certain action is performed by the first user, and a certain action is performed by the second user. In both embodiments, upon receiving the breach notification from the user device 105, the cloud service provider 115*b* determines that the first user of device 105 and the second user of device 145 have shared content with the cloud service provider 115*b*. The shared content may comprise, for example, a shared document or shared access to social media accounts of the first user and the second user. The shared content may be determined in any suitable manner, such as by comparing the content of the separate accounts of the first user and the second user with the cloud service provider 115*b*.

In the first embodiment, the cloud service provider 115*b* restricts access of the second user (e.g., access to the cloud service provider 115*b* via client 110*b*'' on device 145) until such time as the first user complies with a security profile that is sent to the user device 105. For example, the security profile 147*b*'' on the device 145 may restrict access to the cloud service provider 115*b* from the device 145 until after the first user re-authenticates at the user device 105. In the second embodiment, the cloud service provider 115*b* restricts access of the second user (e.g., access to the cloud service provider 115*b* via client 110*b*" on device 145) until such time as the second user complies with the security profile 147*b*" that is sent to the user device 145. For example, the security profile 147*b*" on the device 145 may restrict access to the cloud service provider 115*b* from the device 145 until after the second user re-authenticates at their device 145. In both embodiments, the restricted access at the device 145 of the second user may be less restrictive than that applied at the user device 105 of the first user where the event was detected. For example, while waiting for the first user to comply with their security profile, the second user may be prevented from accessing only that content that is shared with the first user, but would be provided access any content that is not shared with the first user.

According to aspects of the invention, the security profile on a particular user device may be applied by a corresponding one of the clients 110*a-n* or the manager 150 on the user device. For example, in a first embodiment each client 110*a-n* accesses the account registry 125 to determine if there is a security profile that must be satisfied before accessing a cloud service provider 115*a-n*. In this embodiment, the client 110*a* accesses the account registry 125 each time a user invokes client 110*a* to determine if a security profile has been issued by cloud service provider 115*a*. In the event that the account registry 125 contains a security profile 147*a* from cloud service provider 115*a*, then the client 110*a* applies the security profile 147*a* before granting the user normal access to the cloud service provider 115*a*. In the event that the account registry 125 does not contain a security profile from cloud service provider 115*a*, then the client 110*a* may obtain the pre-authentication token 130*a* and grant the user normal access to the cloud service provider 115*a*. In this manner, the security profiles are applied by the respective clients 110*a-n*.

In another embodiment, the manager 150 acts as a proxy for communication between the clients 110*a-n* and the cloud service providers 115*a-n*. In this embodiment, the manager 150 intercepts the request from a client (e.g., client 110*a*) to a corresponding cloud service provider (e.g., cloud service provider 115*a*), and checks the account registry 125 to determine if there is a security profile that must be satisfied before accessing the corresponding cloud service provider (e.g., cloud service provider 115*a*). In the event the account registry 125 contains a security profile 147*a* from the corresponding cloud service provider, then the manager 150 applies the security profile 147*a* before establishing access between the client and the cloud service provider. In this manner, the security profiles are applied by the manager 150. In either embodiment, a particular security profile may be deleted from the account registry 125 after the user complies with the requirements of the security profile.

Figure 5:
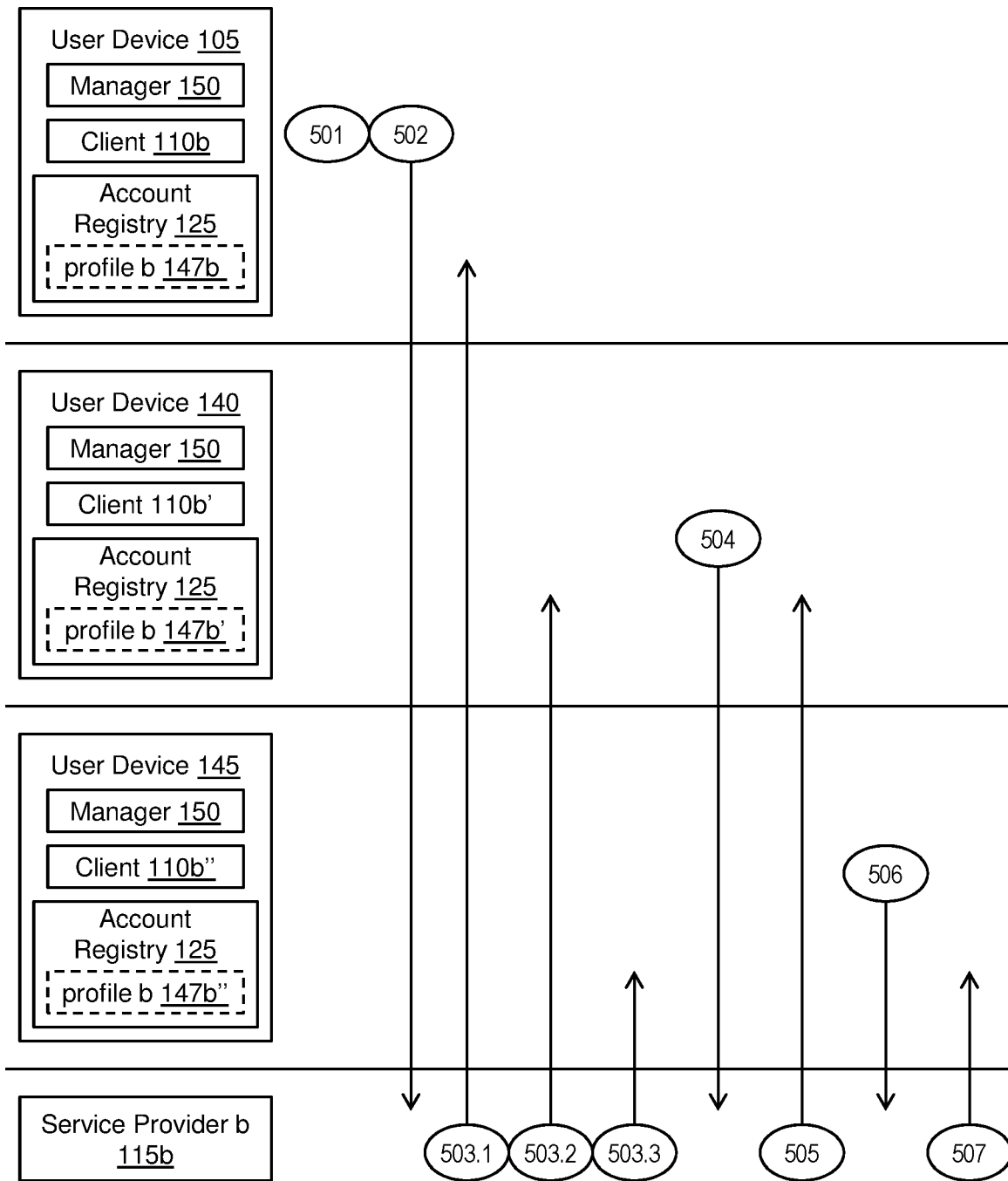
FIG. 5 shows a swim lane diagram of an exemplary implementation in accordance with aspects of the invention.

FIG. 5 shows a swim lane diagram of an exemplary implementation in accordance with aspects of the invention. The steps of FIG. 5 may be implemented in the environment of FIG. 4, for example, and are described using reference numbers of elements depicted in FIG. 4.

At step 501, manager 150 on user device 105 detects an event that indicates a potential security compromise of the user device 105. At step 502, the manager 150 identifies client 110*b* on the user device 105 (e.g., by accessing the account registry 125) and sends a breach notification to the cloud service provider 115*b*. Step 502 may include the manager 150 identifying other clients available on the user device 105 and sending a respective breach notification to each corresponding cloud service provider, e.g., as described with respect to FIG. 4.

At step 503.1, the cloud service provider 115*b* sends a security profile 147*b* to the user device 105. The security profile 147*b* prevents the user from accessing the cloud service provider 115*b* via the client 110*b* on the user device 105 until after the user satisfies the requirement of the security profile 147*b*.

At step 503.2, the cloud service provider 115*b* determines that user device 140 is associated with the same user as user device 105, and sends a security profile 147*b*' to the user device 140. The security profile 147*b*' on the user device 140 prevents the user from accessing the cloud service provider 115*b* via the client 110*b*' on the user device 140 until after the user satisfies the requirement of the security profile 147*b*'.

At step 503.3, the cloud service provider 115*b* determines that user device 145 is associated with a second user that shares content with the first user of user device 105. At step 503.3, the cloud service provider 115*b* sends a security profile 147*b*" to the user device 145. The security profile 147*b*" on the user device 145 prevents the second user from accessing the cloud service provider 115*b* (or from accessing only the shared content) via the client 110*b*" on the user device 145 until after the second user satisfies the requirement of the security profile 147*b*".

At step 504, the first user invokes the client 110*b*' on user device 140. The security profile 147*b*' is applied (e.g., by the client 110*b*' or the manager 150 on the user device 140), and the first user successfully responds to the security profile (e.g., re-authenticates with the client 110*b*' on the user device 140). At step 505, the cloud service provider 115*b* accepts the user response to the security profile 147*b*' and permits the user to access the cloud service provider 115*b* via the client 110*b*', e.g., by deleting the security profile 147*b*' from the account registry of the user device 140.

At step 506, the second user invokes the client 110*b*" on user device 145. The security profile 147*b*" is applied (e.g., by the client 110*b*" or the manager 150 on the user device 145), and the second user successfully responds to the security profile (e.g., re-authenticates with the client 110*b*" on the user device 145). At step 507, the cloud service provider 115*b* accepts the second user response to the security profile 147*b*" and permits the second user to access the cloud service provider 115*b* via the client 110*b*", e.g., by deleting the security profile 147*b*" from the account registry of the user device 145.

Figure 6:
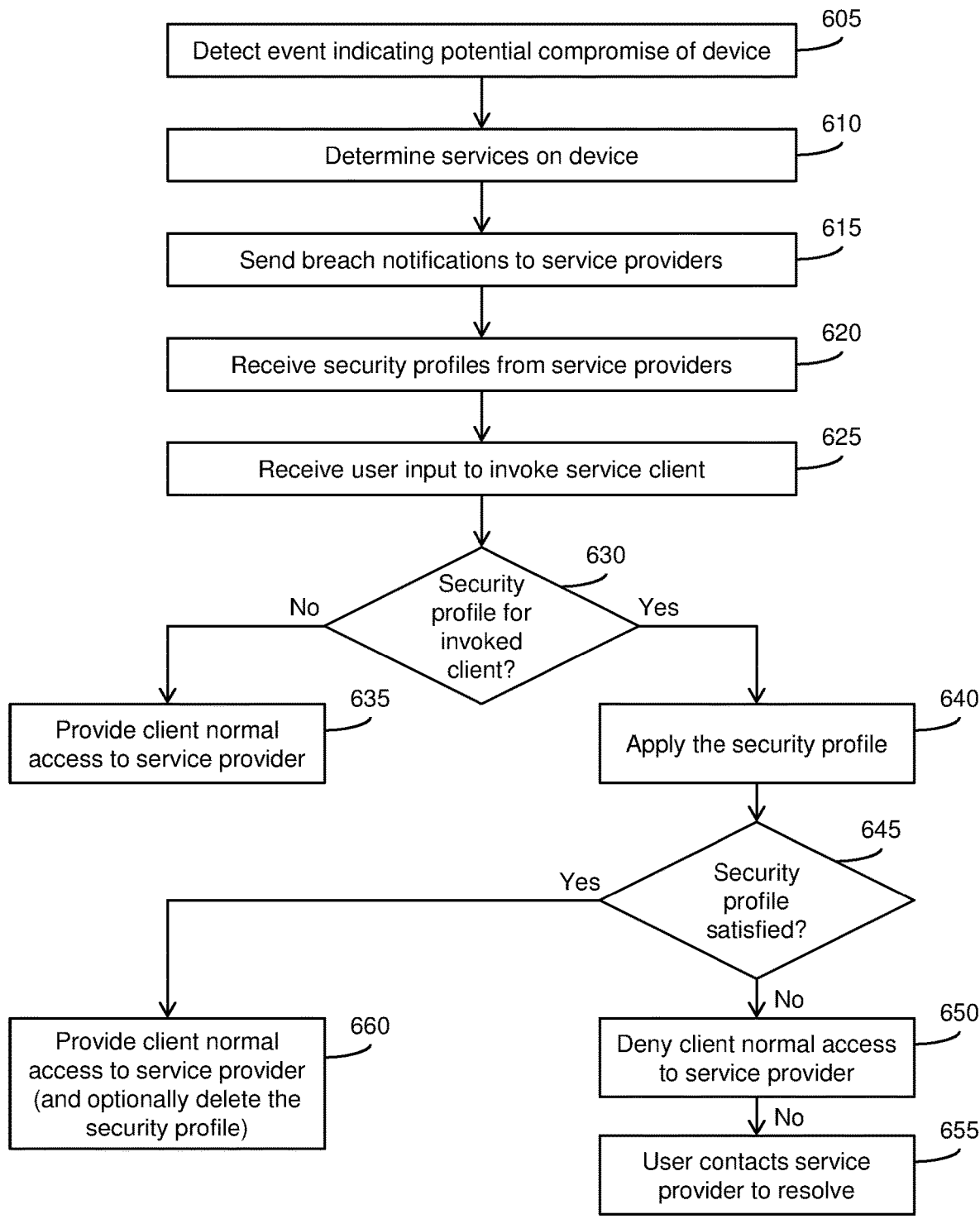
FIGS. 6 and 7 show flowcharts of exemplary methods in accordance with aspects of the present invention.
Figure 7:
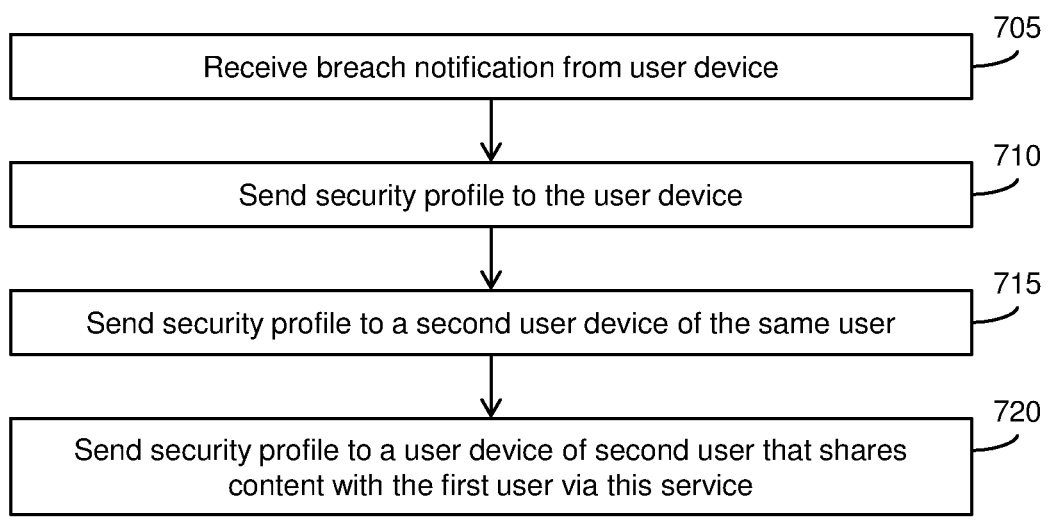

FIGS. 6 and 7 show flowcharts of exemplary methods in accordance with aspects of the present invention. The steps of FIGS. 6 and 7 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

FIG. 6 shows a flowchart of an exemplary sequence of steps that occur at a user device in accordance with aspects of the invention. At step 605, a user device (e.g., user device 105) detects an event that indicates a potential security compromise of the user device. In embodiments, the event is detected by or communicated to a manager (e.g., manager 150) running on the user device.

At step 610, the user device determines all clients (e.g., clients 110*a-n*) that are installed on the user device. In embodiments, the manager determines the clients by accessing an account registry (e.g., account registry 125).

At step 615, the user device sends a respective breach notification to each cloud service provider (e.g., cloud service providers 115a-n) corresponding to the clients determined at step 610. The breach notification may include data that defines the event that was detected at step 605, including for example: identifier of the user device; identifier of the user; timestamp of the detected event; and type of the detected event.

At step 620, the user device receives a security profile from at least one of the cloud service providers to which the breach notifications were sent at step 615. Each one of the cloud service providers may provide a different security profile. In embodiments, the manager stores the security profiles in the account registry.

At step 625, the user device receives a user input to invoke one of the clients installed on the user device. Step 625 may include, for example, receiving input from a touch screen of a smartphone, receiving input from a mouse of a desktop computer, or receiving input from a track pad of a laptop computer.

At step 630, the user device determines whether a security profile exists for the client that was invoked at step 625. In a first embodiment, the client that is being invoked accesses the account registry to determine whether a security profile is stored for this client. In a second embodiment, the manager accesses the account registry to determine whether a security profile is stored for this client.

In the event that a security profile is not stored for this client, then at step 635 the user device provides the user with normal access to the cloud service provider (via the client) in a conventional manner. In the event that a security profile is stored for this client, then at step 640 the user device applies the security profile. In embodiments, applying the security profile includes preventing normal access to the cloud service provider until after the user satisfies the requirement(s) of the security profile. Applying the security profile may include, for example, requiring the user to: re-authenticate, answer a security question, complete a two-factor authentication, etc.

At step 645, the user device determines whether the security profile (applied at step 640) is satisfied. In the event that the security profile is not satisfied (e.g., the user does not successfully perform the requirements of the security profile), then at step 650 the user is denied access to the cloud service provider. At step 655, the user may contact the cloud service provider via a different channel (e.g., a help desk, technical support, etc.) to attempt to resolve the issue to regain normal access to the cloud service provider. On the other hand, in the event that the security profile is satisfied, then at step 660 the user device provides the user with normal access to the cloud service provider (via the client) in a conventional manner. Step 660 may also include deleting the security profile for this cloud service provider from the account registry, while leaving any other security profiles intact.

FIG. 7 shows a flowchart of an exemplary sequence of steps that occur at a cloud service provider device (e.g., server) in accordance with aspects of the invention. At step 705, a cloud service provider device (e.g., a server associated with cloud service provider 115a) receives a breach notification from a user device (e.g., user device 105). The breach notification may include data that defines an event that was detected the user device including for example: identifier of the user device; identifier of the user; timestamp of the detected event; and type of the detected event.

At step 710, the cloud service provider device sends a security profile to the user device. In embodiments, the security profile is specific to the user device and is configured to prevent the user from accessing services of the cloud service provider via the user device (e.g., user device 105) until after the user successfully complies with one or more requirements defined in the security profile. The one or more requirements may include, for example, requiring the user to: re-authenticate, answer a security question, complete a two-factor authentication, etc.

At step 715, the cloud service provider identifies another device (e.g., device 140) that is associated with the same user as the user device (e.g., user device 105), and sends a security profile to this other device. The other device identified at step 715 may include, for example, a second computer device belonging to the same user, and on which is installed an instance of the client that corresponds to this cloud service provider. In embodiments, the security profile is specific to the other device (e.g., device 140) and is configured to prevent the user from accessing services of the cloud service provider via the other device (e.g., device 140) until after the user successfully complies with one or more requirements defined in the security profile. The one or more requirements may include, for example, requiring the user to: re-authenticate, answer a security question, complete a two-factor authentication, etc.

At step 720, the cloud service provider identifies another device (e.g., device 145) that is associated with a second user that shares content with the first user of the user device (e.g., user device 105), and sends a security profile to this other device (e.g., device 145). In embodiments, the security profile is specific to the other device (e.g., device 145) and is configured to prevent the second user from accessing the shared content via the other device (e.g., device 145) until after one of the first user or the second user successfully complies with one or more requirements defined in the security profile.

Aspects of the invention thus provide systems and methods that increase the security profile of one or more cloud services associated with a user when the number of login attempts from a user device exceeds a threshold. Further, the new security profile may be automatically applied on all of the user's devices that utilize the same cloud service. Additionally, each provider may be allowed to apply the increased security profile differently.

In accordance with aspects of the invention, there is a system and method for receiving, by a cloud service, notification from a first device of a first user of the cloud service that suspicious activity is detected (e.g., multiple failed login attempts within a predefined time interval); identifying, by the cloud service, a plurality of devices that have accessed the cloud service of the first user; and sending, by the cloud service, first enhanced user security profiles (e.g., requiring an answer to a security question) to each of the identified plurality of devices. In embodiments, when a second one of the identified plurality of devices that have accessed the cloud service of the first user is associated with a second user (i.e., two users access the same cloud service account), then a second enhanced user security profile is sent to the second one of the identified plurality of devices.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   determining, by a user device, a service accessible on the user device;
   receiving, by the user device, a security profile from a service provider providing the service;
   receiving, by the user device, a user input from a user of the user device to invoke a client installed on the user device;
   determining, by the user device, whether the security profile applies to the client;
   in response to the determining, providing the user, via the client, by the user device, access to the service when the security profile does not apply to the client;
   in response to the determining, applying, by the user device, the security profile to the client when the security profile applies to the client, and restricting, by the user device, access to the service by the client of the service provider on the user device until the security profile is satisfied by the user;
   determining, by the user device, whether the applied security profile is satisfied by the user;
   providing the client to which the security profile applies, by the user device, access to the service and deleting the security profile when the security profile is satisfied; and
   denying the client to which the security profile applies, by the user device, access to the service when the security profile is not satisfied.

2. The method of claim 1, wherein the service provider is a cloud service provider, and the user device and the cloud service provider are different nodes in a cloud network.

3. The method of claim 2, wherein the client is a cloud service client that uses a pre-authentication token to provide access to the cloud service provider when the user invokes the cloud service client.

4. The method of claim 1, further comprising detecting, by the user device, an event that indicates a potential security compromise of the user device, wherein the event comprises exceeding a predefined number of failed login attempts on the user device.

5. The method of claim 1, wherein the security challenge includes at least one from the group consisting of:
   re-authenticating with the client on the user device; and
   answering a security question.

6. The method of claim 1, wherein:
   the determining the service accessible on the user device comprises determining a plurality of different services accessible on the user device, each one of the plurality of different services corresponding to one of a plurality of different service providers.

7. The method of claim 6, wherein the receiving the security profile comprises receiving a respective security profile from each one of the plurality of different service providers.

8. The method of claim 7, wherein a first security profile received from a first one of the plurality of different service providers has different requirements than a second security profile received from a second one of the plurality of different service providers.

9. The method of claim 7, further comprising storing the respective security profiles in a registry with at least one pre-authentication token for at least one of the plurality of different services.

10. The method of claim 9, further comprising deleting a particular one of the respective security profiles from the registry after the user has satisfied the particular one of the respective security profiles.

11. The method of claim 1, wherein the client checks for and applies the security profile when the client is invoked on the user device.

12. The method of claim 1, wherein a manager acts as a proxy between the client and the service provider, and the manager checks for and applies the security profile when the client is invoked on the user device.

13. The method of claim 1, wherein the user device includes software provided as a service in a cloud environment.

14. The method of claim 1, wherein the restricting of access to the service is based on receiving the user input, by the user device, to invoke the client and receiving of the security profile from the service provider.

15. The method of claim 14, wherein the user input to invoke the client is received from at least one of the group consisting of: a touch screen; a mouse; and a trackpad.

16. The method of claim 14, further comprising determining whether the security profile has been received by the user device from the service provider by consulting an account registry in the user device which stores the security profile when it is received from the service provider.

17. The method of claim 1, wherein the security profile is satisfied by the user completing a security challenge defined in the security profile.

18. The method of claim 1, further comprising contacting the service provider, by the user device, to attempt to resolve the issue regarding not satisfying the security profile.

19. The method of claim 17, wherein the security challenge includes at least one from the group consisting of:
   completing a bio-metric challenge; and
   performing a multi-factor authentication.

20. The method of claim 1, wherein:
   the determining the service accessible on the user device comprises determining a plurality of different services accessible on the user device, each one of the plurality of different services corresponding to one of a plurality of different service providers;

the receiving the security profile comprises receiving a respective security profile from each one of the plurality of different service providers;

a first security profile received from a first one of the plurality of different service providers has different requirements than a second security profile received from a second one of the plurality of different service providers;

the security profile is satisfied by the user completing a security challenge defined in the security profile; and the security challenge includes at least one from the group consisting of:
  completing a bio-metric challenge; and
  performing a multi-factor authentication, the method further comprising:

detecting, by the user device, an event that indicates a potential security compromise of the user device, wherein the event comprises exceeding a predefined number of failed login attempts on the user device;

storing the respective security profiles in a registry with at least one pre-authentication token for at least one of the plurality of different services;

deleting a particular one of the respective security profiles from the registry after the user has satisfied the particular one of the respective security profiles; and contacting the service provider, by the user device, to attempt to resolve the issue regarding not satisfying the security profile.

* * * * *